J. A. MOFFAT.
CREAM SEPARATOR ATTACHMENT FOR MILK BOTTLES.
APPLICATION FILED JUNE 1, 1917.

1,282,103.

Patented Oct. 22, 1918.
2 SHEETS—SHEET 1.

Inventor
John A. Moffat
By
Attorneys

J. A. MOFFAT.
CREAM SEPARATOR ATTACHMENT FOR MILK BOTTLES.
APPLICATION FILED JUNE 1, 1917.
1,282,103.
Patented Oct. 22, 1918.
2 SHEETS—SHEET 2.
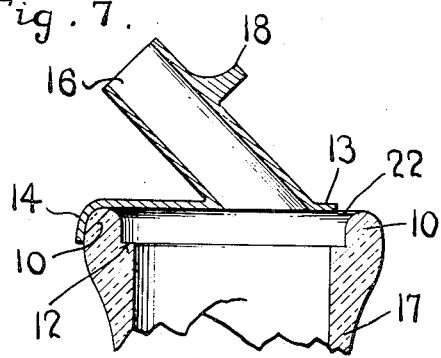
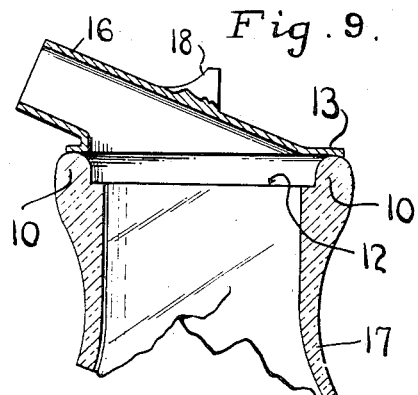
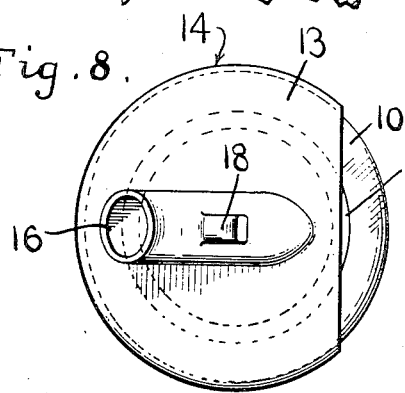
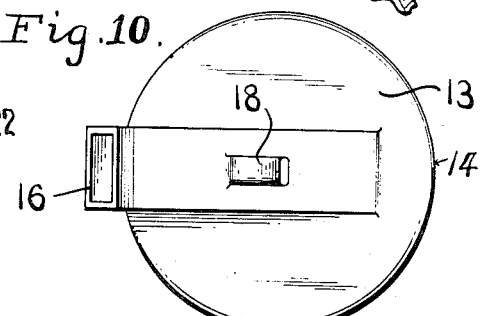
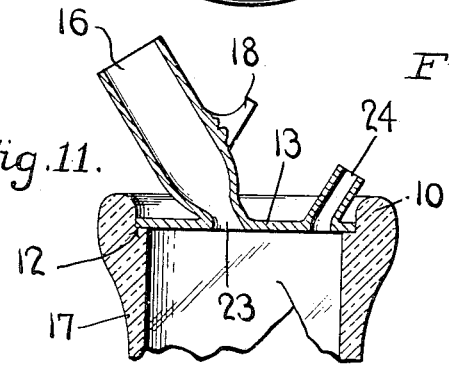
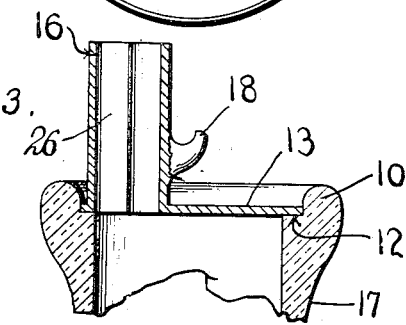
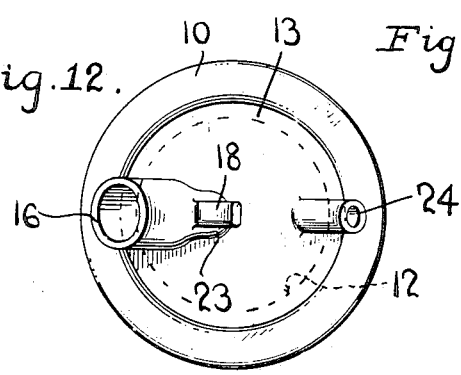
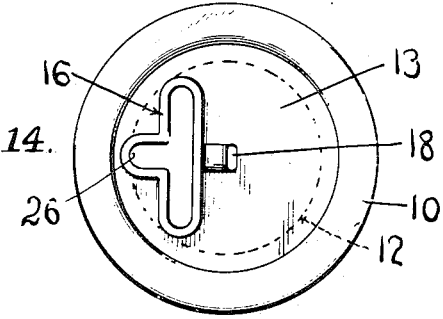
Inventor
John A. Moffat
By *Attorneys*

UNITED STATES PATENT OFFICE.

JOHN A. MOFFAT, OF HAMILTON, ONTARIO, CANADA.

CREAM-SEPARATOR ATTACHMENT FOR MILK-BOTTLES.

1,282,103.  Specification of Letters Patent.  Patented Oct. 22, 1918.

Application filed June 1, 1917. Serial No. 172,211.

*To all whom it may concern:*

Be it known that I, JOHN A. MOFFAT, a subject of the King of Great Britain, residing at Hamilton, in the Province of Ontario and Dominion of Canada, have invented certain new and useful Improvements in Cream-Separator Attachments for Milk-Bottles, of which the following is a specification.

This invention relates to improvements in devices adapted to be applied to milk bottles to enable the cream to be separated from the milk, and has for one of its objects to simplify and improve the construction and increase the efficiency and utility of devices of this character.

Another object of the invention is to provide a device which may be applied without structural change to milk bottles of various forms, and which may be held in position upon the bottle with the finger of one hand while the cream is being removed, and which effectually prevents leakage of the cream or milk, and likewise prevents the cream from flowing down over the body of the bottle.

With these and other objects in view, the invention consists in certain novel features of construction, as hereinafter shown and described and then specifically pointed out in the claims; and in the drawings illustrative of the preferred embodiment of the invention—

Fig. 7 is a view similar to Fig. 3 illustrating another modification in the construction;

Fig. 8 is a plan view of the parts shown in Fig. 7;

Fig. 9 is a view similar to Fig. 3 illustrating another modification in the construction;

Fig. 10 is a plan view of the parts shown in Fig. 9;

Fig. 11 is a view similar to Fig. 3 illustrating another modification in the construction;

Fig. 12 is a plan view of the parts shown in Fig. 11;

Fig. 13 is a view similar to Fig. 11 illustrating another modification in the construction;

Fig. 14 is a plan view of the parts shown in Fig. 13.

Figure 3:
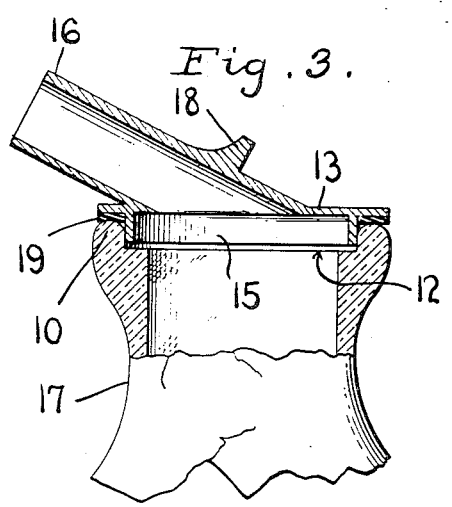
Fig. 3 is a transverse section illustrating a slight modification of the form of the holding flange.

The ordinary bottles employed in delivering milk include a laterally enlarged rim or mouth portion 10 and an internal annular shoulder 12 forming a seat to receive the stopper, which is usually of paper. The improvement which is the subject matter of the present application is arranged to be disposed over the rim 10 as shown in Figs. 1, 2 and 4, and 7 to 10 inclusive, or within the rim as shown in Figs. 3 and 11 to 14 inclusive. The improved device includes a body portion 13 formed either with an external flange 14 to engage over the outer face of the rim 10, or with an internal flange 15 to engage within the rim as shown in Fig. 3, or the body 13 may be in the form of a disk to engage upon the rim 10 as shown in Fig. 9, or upon the bearing shoulder 12 as shown in Figs. 11 and 13. In the form of the structure shown in Figs. 1 to 10 inclusive a discharge spout 16 leads from the body 13 obliquely to the plane of the body and communicates with the interior of the bottle through the body. In the construction shown in Figs. 1, 2, 3 and 4 the discharge spout 16 is circular transversely and relatively large and extends for a considerable distance in advance of the body 17 of the bottle, so that no danger exists of the cream flowing backwardly against the bottle. In the structure shown in Figs. 1 to 4 inclusive the discharge member 16 is located centrally of the bottle, so that when the bottle is tilted into the position shown in Fig. 4 the contents of the bottle will readily flow through the discharge as indicated by dotted lines, while the upper portion of the discharge provides ample means for the entrance of air to prevent the formation of a vacuum and retard the flow. The flow of cream is thus free and uninterrupted and may be readily drawn off from the milk by simply tilting the bottle to one side. In all of the structures shown except Figs. 5 and 6 a stop 18 is shown projecting from the member 16 and against which the forefinger of the person holding the bottle engages to retain the attachment in position upon the bottle. In operating the device, the forefinger is engaged with the lip 18 and the thumb and remaining fingers engage the neck of the bottle.

Thus the operator can exert considerable pressure to hold the device in position.

Figure 5:
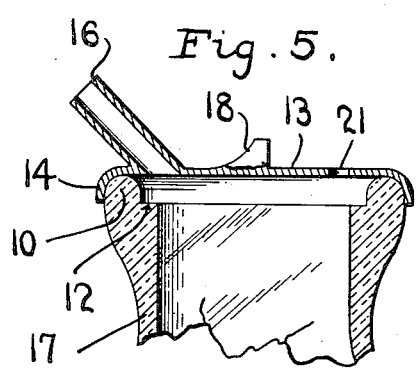
Fig. 5 is a view similar to Fig. 3 showing a modification in the construction.
Figure 6:
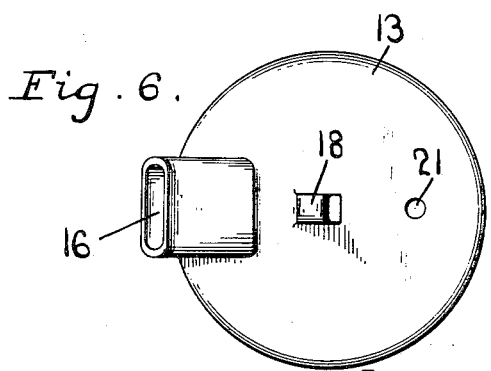
Fig. 6 is a plan view of the parts shown in Fig. 5.

In Figs. 5 and 6 the projection 18 is shown rising from the body of the member 13. It will be noted that the body of the projection 18 is at one side of the center or axial line of the bottle in all of the figures, so that the force of the finger will be exerted to retain the attachment in position during the tilting operation, and as the weight or resistance of the bottle increases with the progress of the tilting movement the grip of the finger will be correspondingly increased naturally and thus effectually prevent all danger of the displacement of the attachment during the tilting operation.

The pressure of the finger naturally increases with the increase of the tilting of the bottle, and by locating the member 18 at one side of the axial line of the bottle, this increase of pressure will be applied in advance of the central line where the greatest pressure is required.

If found necessary a gasket represented at 19, of rubber or the like, will be employed between the body portion 13 and the rim 10 of the bottle. In the modification shown in Fig. 3 the gasket 19 is located externally of the flange which arrangement may be employed under certain circumstances if required.

In Figs. 5 and 6 the discharge member is in the form of a flat tube and the body 13 provided with a vent 21. When the tube 16 is in flat form it will be wholly filled with the escaping cream, and the vent is therefore necessary to prevent the formation of a vacuum which would otherwise retard the flow. In Figs. 7 and 8 the discharge member 16 is circular transversely but is located at one side of the medial line of the bottle and the member 13, and is cut-away at one side as shown at 22 whereby a portion of the rim 10 is uncovered to enable air to enter to accelerate the flow.

In Figs. 9 and 10 the tubular discharge 16 is square in outline transversely which form may be employed if preferred. In these figures also the member 13 is in the form of a flat disk bearing upon the upper face of the rim 10 and held in place by the downward pressure of the finger on the projection 18, which arrangement may be employed under some circumstances if preferred.

In Figs. 11 and 12 the body portion 13 is in the form of a disk engaging the stop shoulders 12 internally of the rim 10 and provided with the discharge tube 16, the tube being converged or reduced toward its intake end as shown at 23 where it communicates with the interior of the bottle through the member 13. In this modification also a relatively small vent tube 24 is employed to prevent the formation of a vacuum. In Figs. 13 and 14 the discharge tube 16 is in T shape transversely, one portion 26 of the tube being relatively small and designed to permit the passage of the cream when the bottle is tilted, while the other portion is relatively wide and provides free entrance of the air to prevent the formation of a vacuum.

These various modifications do not constitute a departure from the principle of the invention or sacrifice any of its advantages.

By employing this simply constructed device the cream may be quickly drawn off from the body of the milk and without disturbing the milk or breaking the continuity of the flow of the cream.

Figure 1:
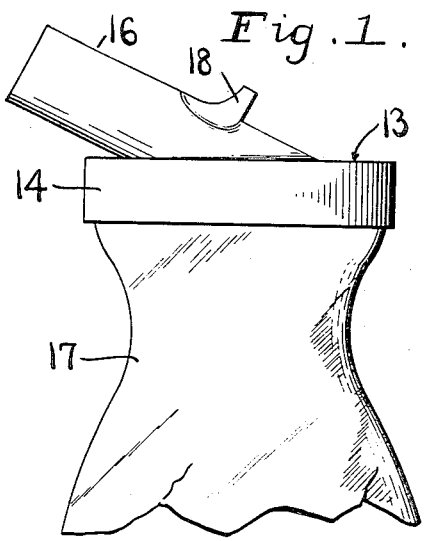
Figure 1 is a side elevation of a portion of a conventional milk bottle with the improved device applied.
Figure 4:
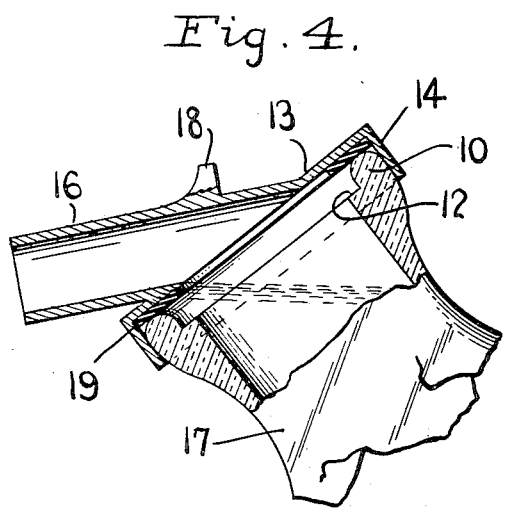
Fig. 4 is a view similar to Fig. 3 showing the bottle and the attachment tilted to permit the cream to escape.
Figure 2:
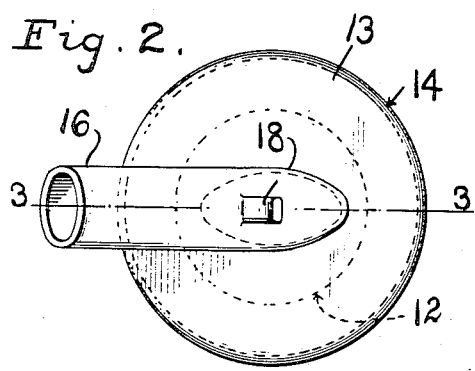
Fig. 2 is a plan view of the parts shown in Fig. 1.

By inclining the spout obliquely to the transverse plane of the rim of the bottle and of the base portion 13 of the attachment, it will be impossible for the cream to begin to flow until the lower line of the discharge is below the level of the top of the cream, as illustrated in Fig. 4.

With the spout 16 relatively large transversely, ample room is provided for the entrance of air above the flowing cream, hence the flow will be steady and continuous, and jerky or irregular movements effectually prevented.

The stop member 18 being in advance of the medial line of the bottle enables the operator to hold the attachment on the bottle with greater certainty.

The attachment may be constructed of any suitable material, but will preferably be of glass, or like material or compound, and may be constructed to fit the rim of the bottle so closely as to obviate the necessity for using gaskets or other packing devices.

If made of glass, it will be transparent so that all the steps of the operation can be observed, especially if the containers are of fiber or other opaque material.

Having thus described the invention, what is claimed as new is:

1. An attachment for containers comprising a supporting body adapted to be engaged over the outlet of the container, a discharge conductor leading from said body, and a finger grip extending from said conductor with its finger engaging face located between the center line of the body and the outlet end of the conductor, whereby the pressure of the finger will retain the body in position when the container is tilted to discharge the contents.

2. An attachment for containers comprising a supporting body adapted to be engaged over the outlet of the container, a discharge conductor leading from said body and in continuous straight lines from end to end, and a finger grip extending from said conductor with its finger engaging face located between the center line of the body and the outlet end of the conductor, whereby the pressure of the finger will retain the body in position when the container is tilted to discharge the contents.

3. An attachment for containers comprising a supporting body adapted to be engaged over the outlet of the container, a discharge conductor leading from said body at an angle to the plane of the body, and a finger grip extending from said conductor with its finger engaging face located between the center line of the body and the outlet end of the conductor, whereby the pressure of the finger will retain the body in position when the container is tilted to discharge the contents.

4. An attachment for containers comprising a supporting body adapted to be engaged over the outlet of the container, a discharge conductor leading from said body, and a finger grip extending from said conductor whereby the pressure of the finger will retain the body in position when the container is tilted to discharge the contents.

In testimony whereof I affix my signature.

JOHN A. MOFFAT. [L. S.]